United States Patent
Huang

Patent Number: 5,971,733
Date of Patent: Oct. 26, 1999

[54] FLAT PLUG MOLDING DEVICE

[76] Inventor: Chyong-Yen Huang, No. 12, Alley 10, Lane 140, Sec. 1, Shin Sheng South Rd., Taipei, Taiwan

[21] Appl. No.: 09/076,823

[22] Filed: May 13, 1998

[51] Int. Cl.6 .................. B29C 33/12; B29C 45/14
[52] U.S. Cl. .................. 425/116; 264/272.15; 425/125; 425/127
[58] Field of Search .................. 425/116, 117, 425/125, 127; 264/272.15, 278

[56] References Cited

U.S. PATENT DOCUMENTS

| | | | |
|---|---|---|---|
| 3,444,618 | 5/1969 | Sorlie | 425/116 |
| 4,395,375 | 7/1983 | Ferris et al. | 264/272.15 |
| 4,405,083 | 9/1983 | Charlebois et al. | 425/116 |
| 4,556,190 | 12/1985 | Smith | 425/116 |
| 4,574,474 | 3/1986 | Langham | 264/272.15 |
| 5,182,032 | 1/1993 | Dickie et al. | 425/116 |

FOREIGN PATENT DOCUMENTS

| | | | |
|---|---|---|---|
| 56-55229 | 5/1981 | Japan | 425/117 |
| 62-101413 | 5/1987 | Japan | 425/125 |
| 2110587 | 6/1983 | United Kingdom | 264/272.15 |

*Primary Examiner*—Robert Davis
*Attorney, Agent, or Firm*—Rosenberg, Klein & Bilker

[57] ABSTRACT

A flat plug molding device comprised of a lower die, an upper die and a fixing seat in conjunction with conductor wire in practice, within, a cavity in proper thickness is provided and recessed at the center of the lower die, several holding ribs with arc top are provided on one side and a channel formed and recessed on the other side, with two penetrating holes provided at where appropriately in the center of said cavity, the upper die is provided in counter locked type, and a cavity is provided at the recess in the center of said upper die and a channel on one side corresponding to that at the lower die; the fixing seat are erected on it several protection walls at the right angle in proper height designed in conjunction with the route of the conductor wire and the shape of a conductor blade of the conductor wire, and two penetrating holes are provided at where appropriately; both ends of the conductor wire are each connected with a conductor blade which extends downward to form a plug blade with a hole; the plug blade of the conductor wire passes through the penetrating hole at the fixing seat so that the conductor blade of the conductor wire is restricted by its peripheral protection walls and held tightly against the corresponding plane, the fixing seat of the conductor wire is placed in the cavity of the lower die to be counter locked by its corresponding upper die for the filling of plastics in the injection molding of the flat plug.

9 Claims, 8 Drawing Sheets

FLAT PLUG MOLDING DEVICE

BACKGROUND OF THE INVENTION

(1) Field of the Invention

The present invention relates to a molding device for flat plug, more particularly to one allows precise and rapid holding of flexible wires in position during the process of injection molding.

(2) Description of Prior Art

Figure 9:
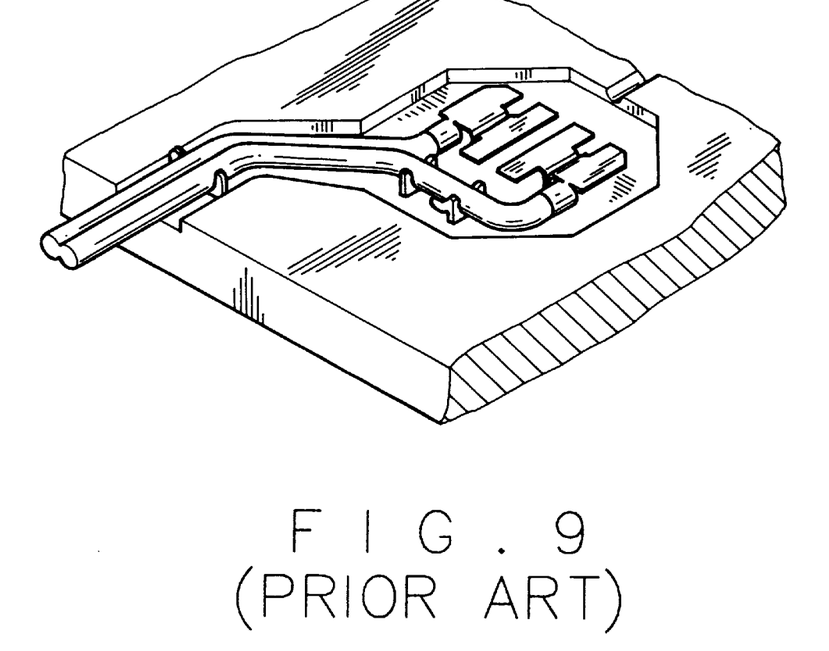
FIG. 9 is a view of the prior art of injection molding device.
Figure 10:
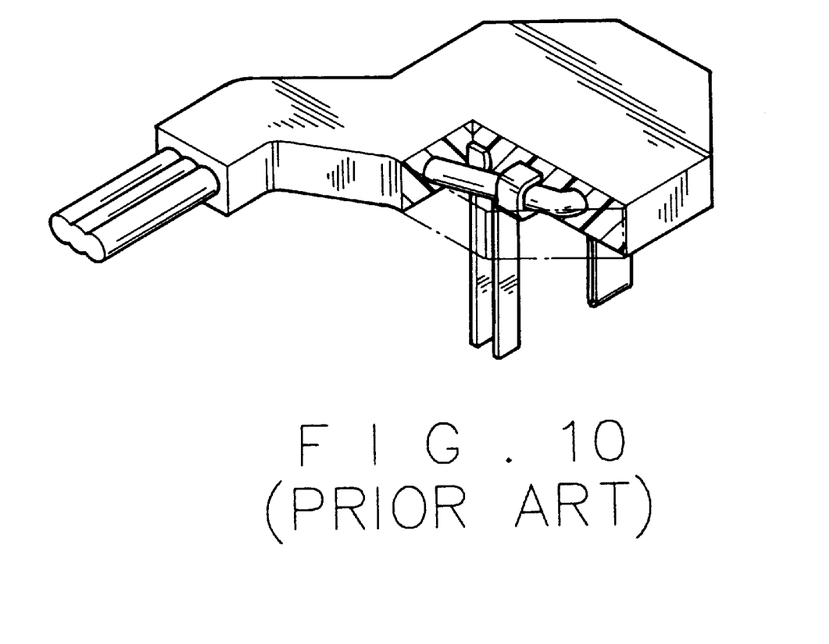
FIG. 10 is a sectional view of a local part of a flat plug of the prior art.

Flat plug gives highly practical use for space-saving and less vulnerable to be pulled out by accident due to the lead-out direction of the conductor wires is vertical to that of the plug blades. However, there exists certain difficulty in the injection molding of flat plug, that is, how to achieve precise positioning of the flexible conductor wires within a limited height of the mold cavity in the process of injection molding of flat plug so that the wires when molded will not be exposed due to displacement in the molding becomes crucial in the molding technology. FIGS. 9 and 10 illustrate the molding methods for the prior art of flat plug, within, thin and rigid forks or blades are used to provide support and fixing by clamping the flexible conductor wires at the precise location inside the mold cavity in the process of injection molding; furthermore, such forks or blades will retract during the final filling stage of molding to allow the plastics back flow into the cave left by the retracted blades, or blades may be retracted upon completing the injection cycle and leave a hollow on the molded workpiece while said forks or blades are made as thin as possible. However, the forks or blades when made thin fail to sufficient rigidity required by precise positioning of the flexible conductor wires at ideal location. Therefore, a practical modification involves retaining said blades in the cast dies and being extruded when the molding plastics get condensed and hardened while leaving a very small and thin hollow on said molded workpiece, such a hollow though causing insignificant affects upon the structure of the molded workpiece, affects the appearance of the finished product by leaving dents on its surface. In addition, said modified molding requires that the conductor wires to be placed in the semi-mold cavity of the lower die before being put in position with said forks or blades, and plastics molded workpiece are filled through injection fluid lateral duct in conjunction the counter locked dies. An issue of manufacturing speed exists, i.e., the prior art must pass through the following procedures in the entire injection molding process:

1. Installing the components into the cavity—plug blades and flexible conductor wires are placed in the cavity of the lower die before both of upper and lower dies are closed, with the plug blade leading through and out from the preserved hole at the lower cavity and the flexible conductor wires following their preset routes are inhibited one by one at the grip ends of said forks (or blades); in case of longer preset routes, the number of said forks increases accordingly, meaning, it consumes more time for the flexible conductor wires to mutually hold in place with the grip ends of each fork to achieve the precise positioning for the wires within a limited height of the cavity.
2. Closing dies—both upper and lower dies close on to each other.
3. Injection—hot melting plastics are injected, cooled and solidified in the cavities when the forks may retreat from or stay in the cavities at the final stage of this stage.
4. Opening dies—both upper and lower dies are opened up, then the already solidified plastics wall wrap up the components placed in Step 1 and the finished product is availed once entirely removed from the cavities for the mold to place another set of components to commence the next cycle of injection molding.

Judging from the procedures disclosed above, it is easy to know that the first step of the prior art requires the process to be operated only during both upper and lower dies are opened up. If the opening and closing of both upper and lower dies are automatically controlled(opened/closed at given time), the operator would have to complete Step 1 within a limited time, and if any fork fails to accurately grip the flexible conductor wires, such section of wire may be exposed due to displacement in the course of filling, resulting in defective product. Furthermore, if the opening/closing of both upper and lower dies are manually controlled, Step 2 will be entered only upon the completion of Step 1 at the cost of the control of output since the time consumed in Step 1 differs. Also, the operator will have to wait out Steps 2 and 3 resulting in a less optimal use of manpower.

The prior art of molding process for allowing only one type of plastics for hot melting injection fails to meet those functional requirements of individual applications, namely:
1. in case of harder plastics—they may provide better strength for the flat plug, proper flexibility to the connection between the plug end and the power line is prevented; and routing for the power wire at such connection will lack in mobility, thus fails to meet requirements of various working environment in practice when such connection end gets too hard.
2. in case of softer plastics—proper flexibility to the connection end is possible but at the expense of proper strength to the flat plug, which then becomes very vulnerable to deformation when external force is applied (e.g., plug is pulled off), and repeated deformation means contacts of conductor wire inside the plug can easily be disengaged or show poor contact, resulting in electric shock or fire hazard.
3. in case of non heat-withstanding plastics—several home appliances consume larger amperage, such as electric iron, and the plug itself gets hotter and softer, leading to deformed plug or accident.
4. in case of plastics meeting all requirements as aforesaid—even there is a type of plastics that is with ideal hardness, fire-proof, and heat-withstanding available for injection molding, the higher cost of such a material is bad news to market competition.

Flat plugs using the prior art of injection molding have less changes to the appearance of the finished products, more difficulties in the demonstration of product quality or special appeal, and less diversified and capable of meeting the individual demands on style among customers.

OBJECTS AND SUMMARY OF THE INVENTION

The primary purpose of the present invention is to provide an injection molding device for flat plug, essentially comprised of a lower die, an upper die, and a fixing seat in conjunction with conductor wires, within, a cavity at the center and two penetrating holes at proper locations are provided at the lower die and a channel formed at its either side; the upper die is made in the counter locked configuration corresponding to the lower die, and several protection walls each in proper height erected at right angle and at where appropriately to the fixing seat, two penetrating holes are provided on a side to the protection wall; two ends of the conductor wire are each connected with a conductor blade which extends downward to form the plug blade which passes through the penetrating hole at the fixing seat and the conductor blade restricted by the protection wall at it its peripheral in the fixing seat and holding against its corresponding plane while the fixing seat housing the conductor wire is placed in the cavity of the lower die to receive the counter locked upper die, then a plastic material in injection molded to form a flat plug. Both of pins and conductor wire can be fixed in place using the fixing seat before the injection so that the assembly comprising said plug blades and conductor wires can be separately made to facilitate the manufacturing process. In the meantime, the design of proper protection wall onto the fixing seat provides for the flexible conductor wires a definite and consistent planned rout to ensure the free of displacement of the wires in the course of injection molding. With various type of cover plate for the fixing seat, diversified appearances and additional functions can be given to finished products for significant improvement of their practical applications.

DESCRIPTION OF THE PREFERRED EMBODIMENT

Figure 1:
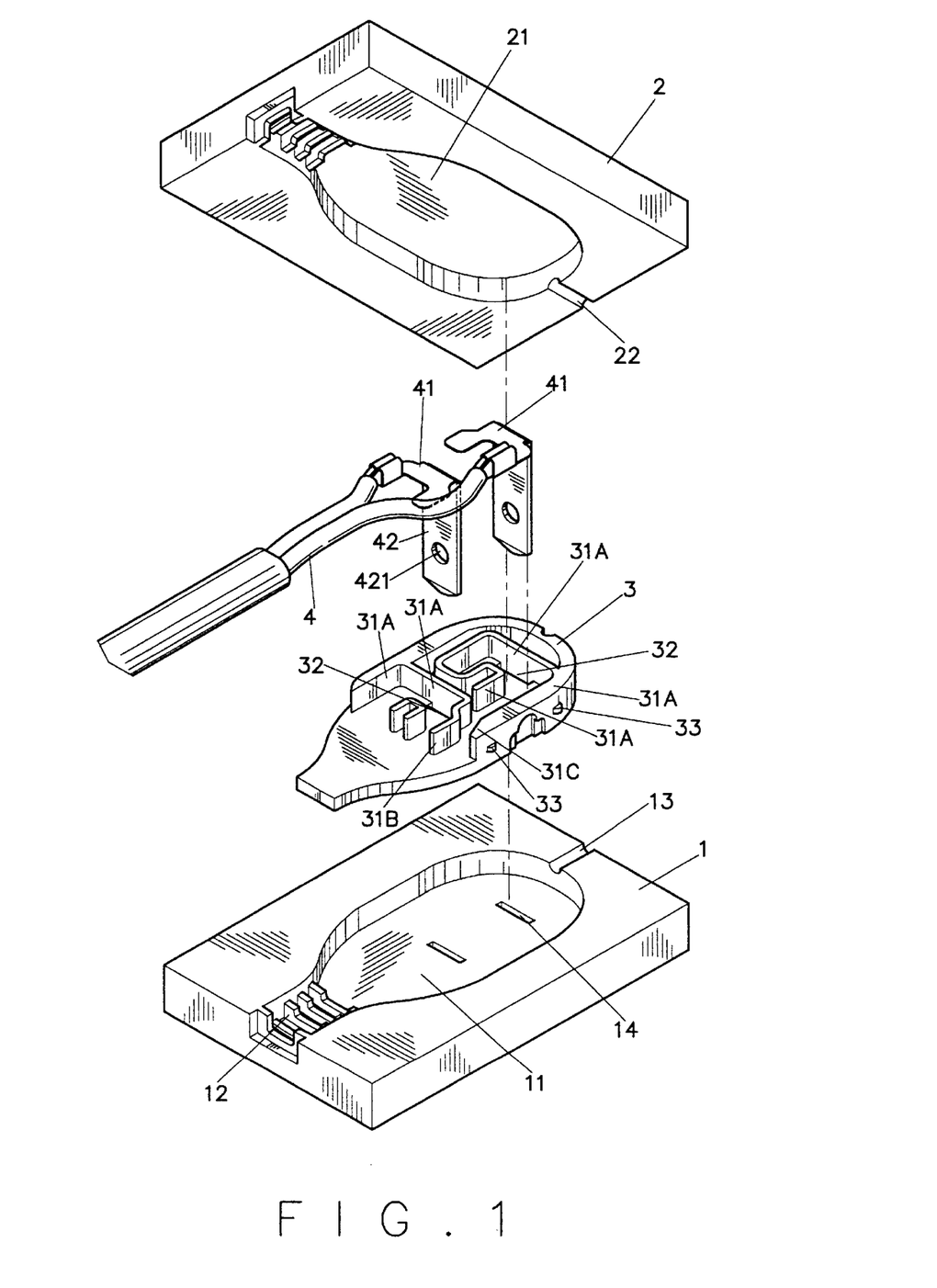
FIG. 1 is a blow-out of the present invention.
Figure 2:
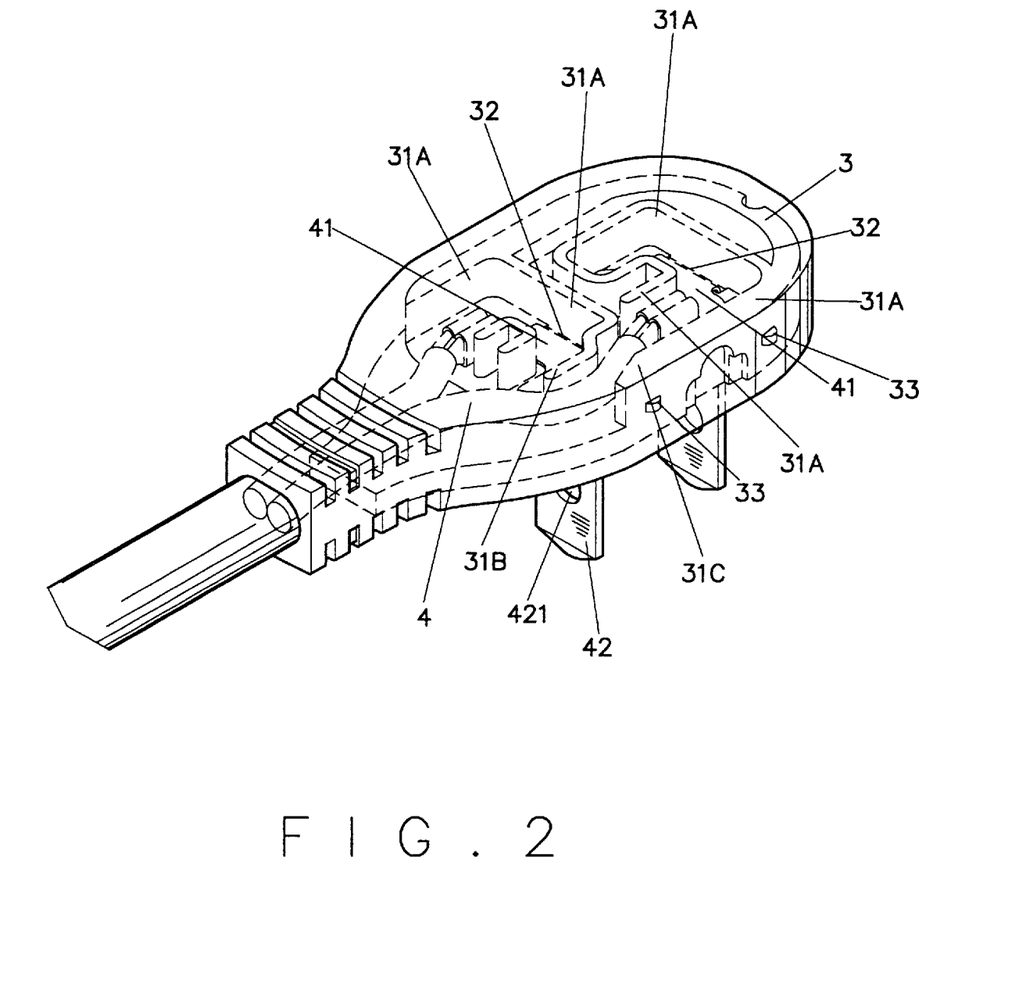
FIG. 2 is a view of the appearance of the present invention.

Referring to FIG. 1, the present invention is comprised of a lower die 1, an upper die 2, a fixing seat 3 and conductor wires 4, within, a cavity 11 in proper thickness is provided in the recess at the center of the lower die 1, the shape of said cavity 11 is formed as the contour of the fixing seat 3 and one side of the lower die 1 is provided in recess several holding ribs 12 with each at its top indicating an arc and a channel formed and recessed on the other side for the injection of plastics while two penetrating holes 14 are provided at where appropriately in the center part of the lower die 1; the upper die 2 is made as a counter locked die corresponding to the lower die 1, a cavity 21 is provided in the center and a channel 22 corresponding to the channel 13 on the lower die 1 is provided on one side of the upper die 2; the fixing seat 3 is a hard seat in proper thickness and in approximate oval shape, with its volume slightly smaller than that of the cavity 11 of the lower die 1, at where appropriately, several protection walls 31A, 31B and 31C are erected at the right angle to the fixing seat 3 in their configuration to accommodate routing of the conductor wires 4 and the shape of conductor blades 41, two penetrating holes 32 are provided at where appropriately in correspondence to said penetrating holes 14 in the lower die 1, and several protuberances 33 (or recesses) are formed at where appropriately on the external wall of the seat 3; and both ends to the conductor wires 4 are provided each with a conductor blade 41 in approximate "⌐" shape, the conductor blade 41 extends downward to form a plug blade 42 with a hole 421. Upon filling the plastics by means of those members disclosed above, the plug blade 42 of the conductor wire 4 passes through the penetrating hole 32 on the fixing seat 3 and the conductor blade 41 of the conductor wire 4 is restricted by the peripheral wall 31A on the fixing seat 3 and holding tightly against its corresponding plane while protection walls 31B and 31C provide an extended route for the conductor wire 4 to hold it in position; then the fixing seat 3 housing the conductor wire 4 is placed in the cavity 11 of the lower die 1 while the plug blade 42 of the conductor wire 4 passes through the penetrating hole 14 of the lower die 1 and the conductor wire 4 is snapped into the arc of the holding ribs 12 of the lower die 1. With the counter locked upper die 2 to close up on the lower die 1, plastics are injected through a fluid entrance formed with the channel 22 from the upper die 2 and the channel 13 from the lower die 1, so that the plastics wrap around the outer peripheral of the fixing seat 3 to mold into the finished product of flat plug when hardened as illustrated in FIG. 2. The molded flat plug in this preferred embodiment has its bottom of the fixing seat 3 flushed with the molded plastics. In addition, a better bonding is provided to both of the fixing seat 3 and solidified plastics due to several protuberances 33 provided on the fixing seat 3 when the plastics wrap around the fixing seat 3.

Figure 3:
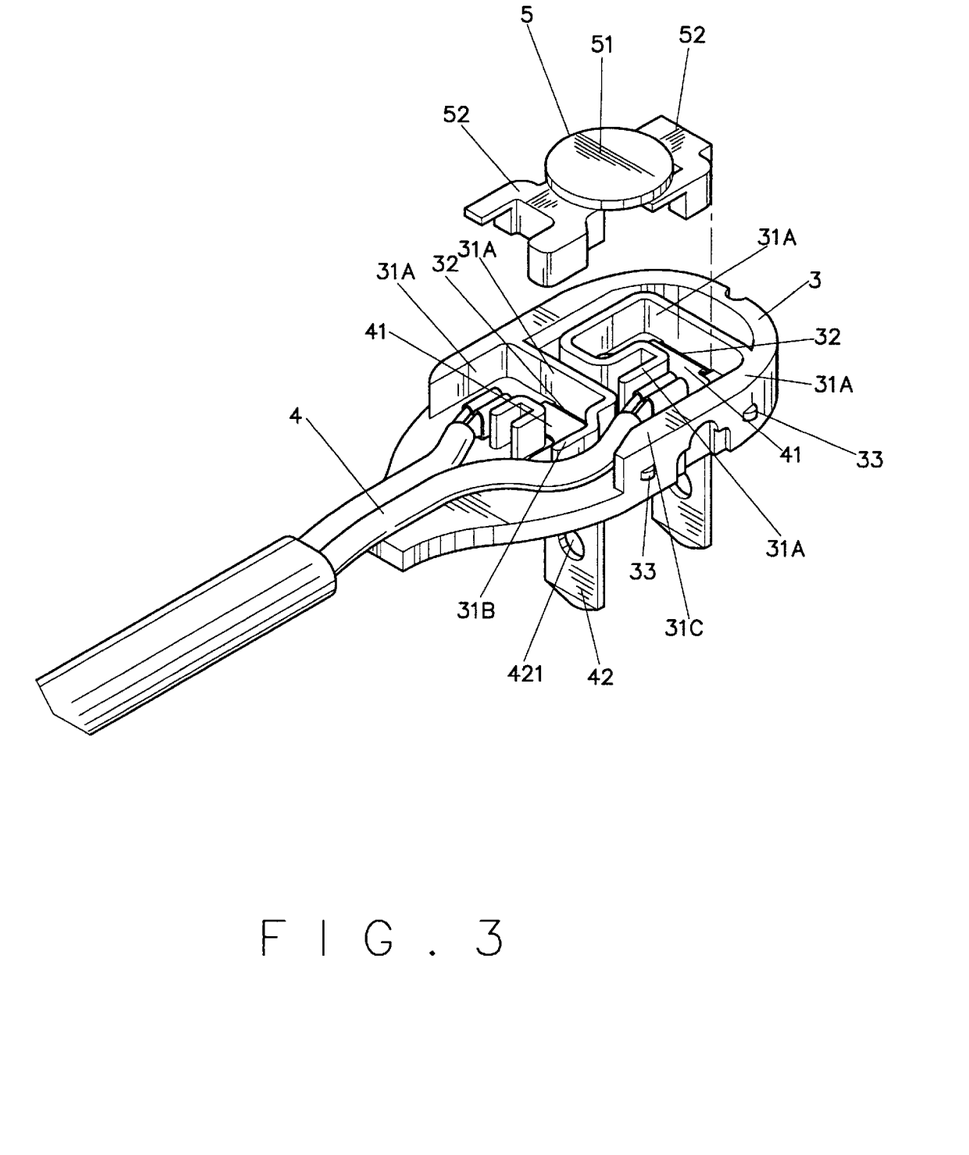
FIG. 3 is a view of the first preferred embodiment of the present invention.
Figure 4:
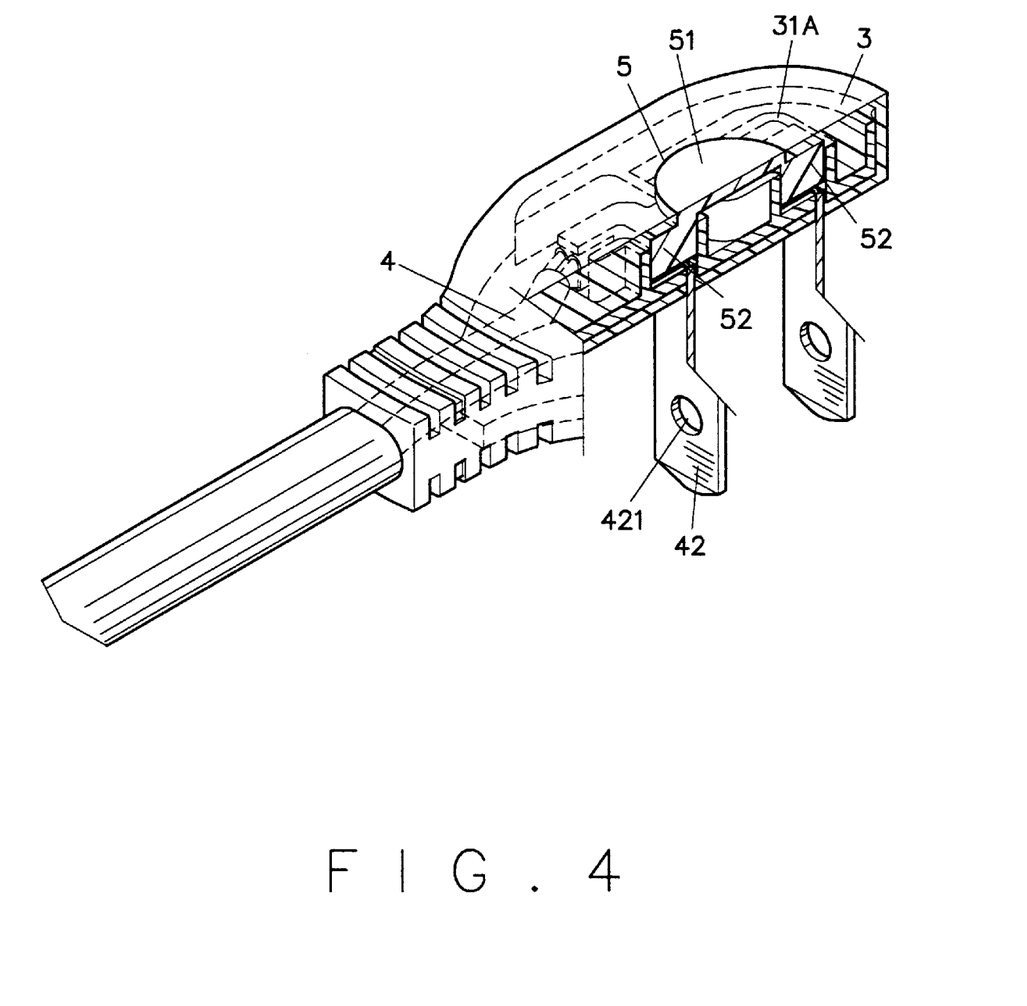
FIG. 4 is a view of the assembly of the first preferred embodiment of the present invention.

Be referring to FIG. 3, in addition to providing the positioning function for the flexible conductor wire 4 by using said protection walls 31A, 31B and 31 from the fixing seat 3 by the present invention, a positioning plate 5 may be provided on the fixing seat 3 housing the conductor wire 4 as illustrated in FIG. 3. Within, both sides at the base of a cover plate 51 of the positioning plate 5 is each fixed with an irregular sheet member 52 which is designed in conjunction with the size and type of the conductor blade 41 of the conductor wire 4 to hold against said conductor blade 41 to free of defectives for the plug blade 42 of the conductor wire 4 in the process of injection molding .The cover plate 51 provided over those two irregular sheet members is flushed with the surface of the flat plug upon the completion of plastics injection is exposed as illustrated in FIG. 4 to allow printing of any logo or mark before the injection to save post process treatment. The entire positioning plate 5 can also be made of see-through, fluorescent, cold light or thermocolor materials. Said positioning plate 5 when made of transparent material gives a very unique visual effect as members inside the plug becomes visible; or highlights itself if made of fluorescent material; or alarms the abnormal temperature of the plug if made of thermocolor. When additional cold light or other illuminating element is provided to the cover plate 51, the plug becomes visible in the dark using the house power to facilitate the plug in and off at night. Therefore, by changing the positioning plate, the present invention exhibits versatile appearance and additional features.

Figure 5:
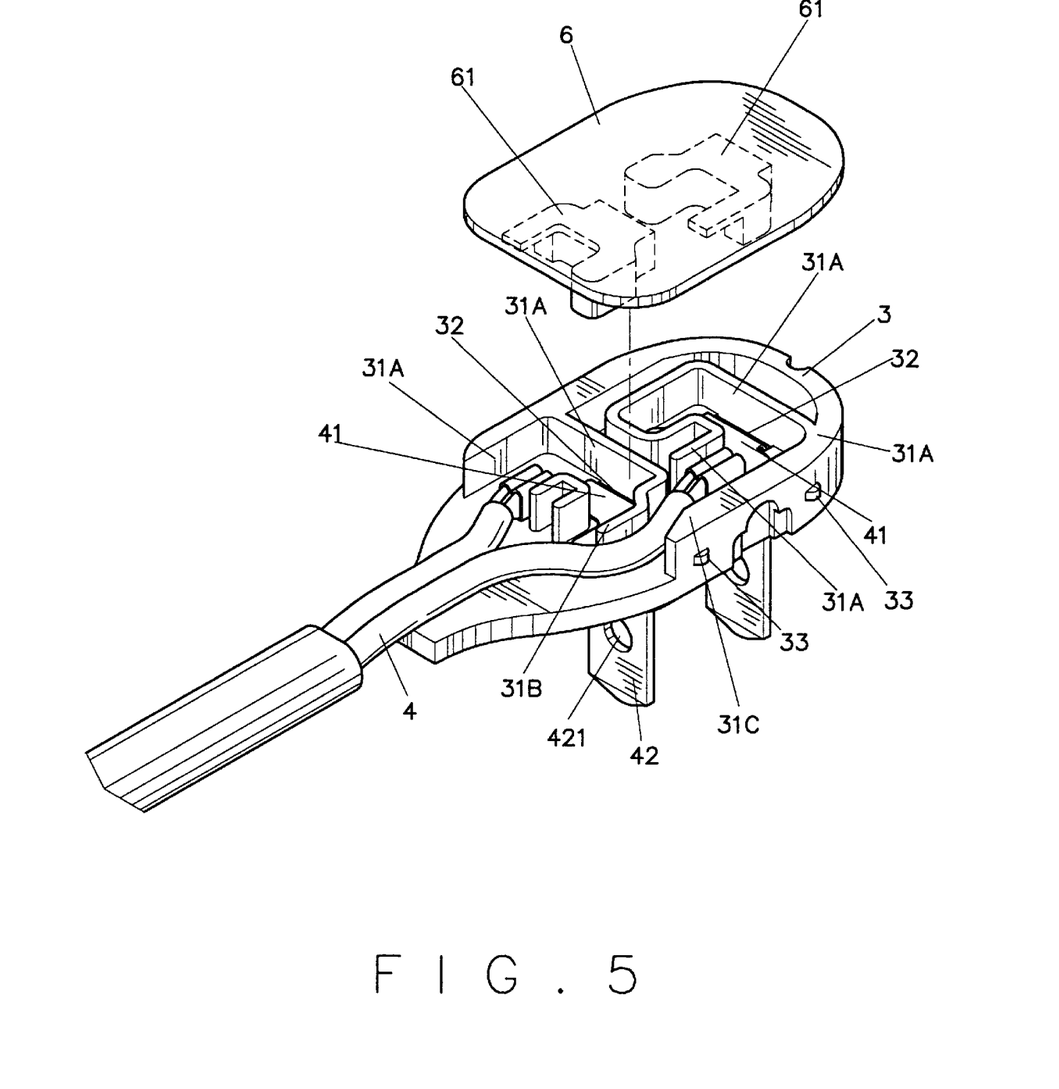
FIG. 5 is a view of the second preferred embodiment of the present invention.

An upper cover 6 can be also provided on the fixing seat 3 of the conductor wire 4 as illustrated in FIG. 5 of the second preferred embodiment of the present invention, within, those irregular sheet members 61 formed at the bottom side of said upper cover 6 designed in conjunction with the size and type of the conductor blade 41 of the conductor wire 4 to hold against the conductor blade 41;

therefore, both of the fixed seat 3 and the upper cover 6 can be made of fire-proof material if a fire proof flat plug will be molded while the general plastics can be used for the external injection molding since usually the current shortage takes place at the conductor wire 4 in the fixing seat 3 and at the connection of plug blades 42. Therefore, in this preferred embodiment of fire-proof flat plug, the conductor wire 4 is held in place by the fire-proof fixed seat 3 and the upper cover 6 and the finished product of flat plug also is fire-proof while saving the expensive cost of using fire-proof material, and the finished product of the preferred flat plug indicates a type with its upper cover 6 completed in-wrapped with plastics posing only the bottom of the fixing seat 3.

Figure 6:
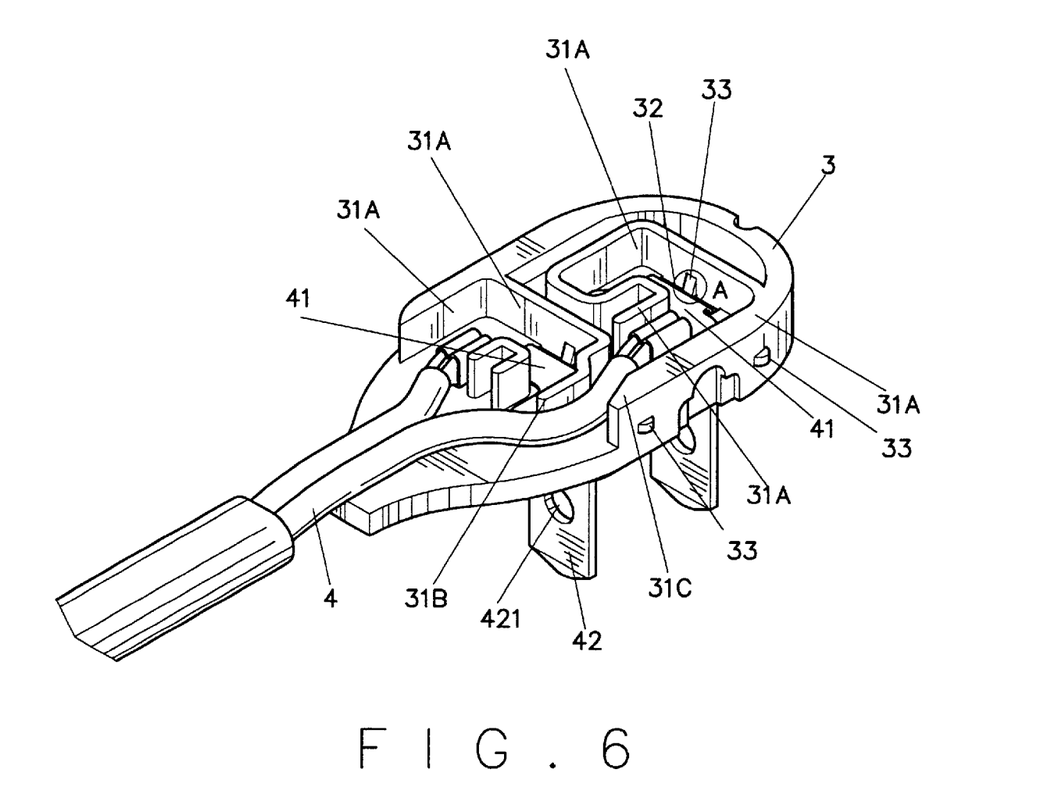
FIG. 6 is a view of the third preferred embodiment of the present invention.
Figure 6A:
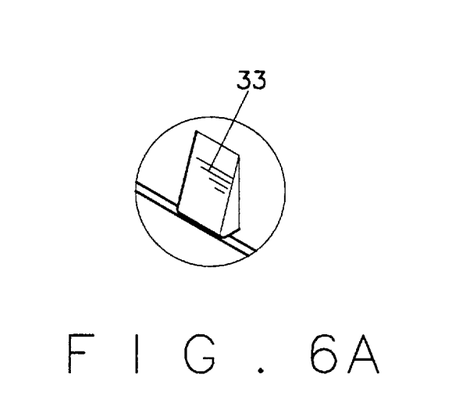
FIG. 6A is an enlarged, partially sectioned, view of circle A of FIG. 6.
Figure 7:
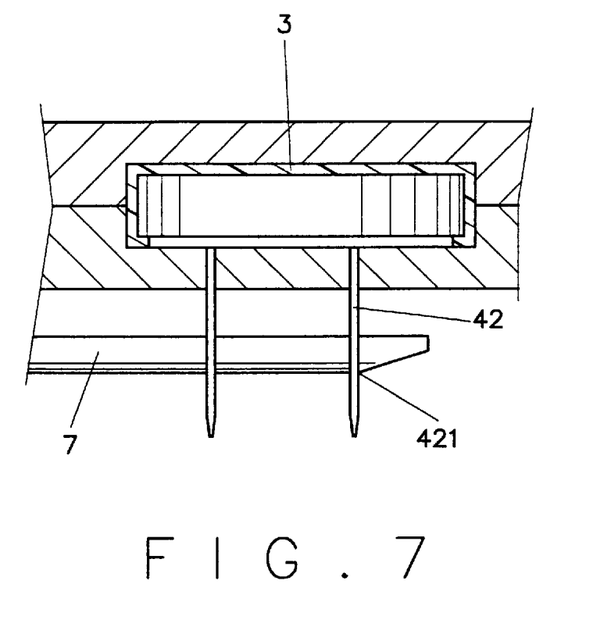
FIG. 7 is a view of the fourth preferred embodiment of the present invention.
Figure 8:
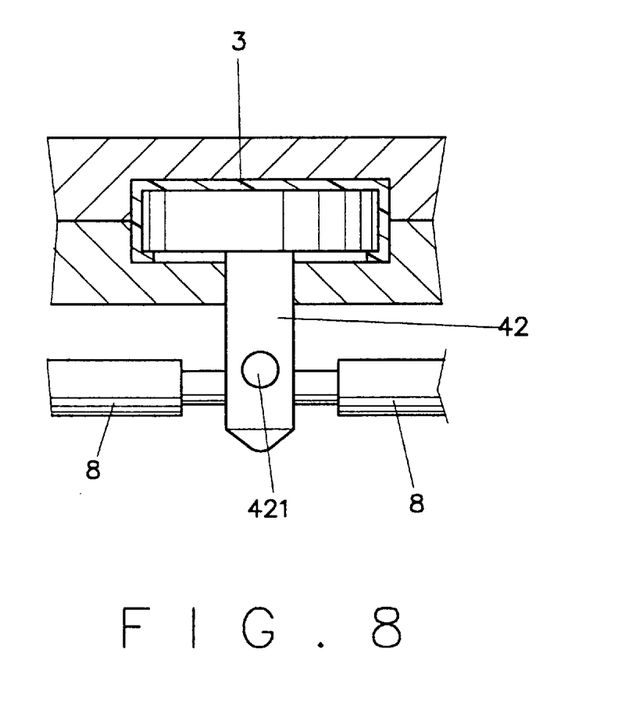
FIG. 8 is a view of the fifth preferred embodiment of the present invention.

As disclosed above, during the filling of plastics, the conductor blade 41 can be fixed by having it tightly held against the protection wall 31A. There are other methods to hold the conductor blade 41 in position in the course of injection of the third preferred embodiment of the present invention as illustrated in FIG. 6. In another preferred embodiment of the present invention, an inverse tenon 34 or nip on the side of the protection wall 31A of the fixing seat 3 so to offer a caulking function at where corresponding to the conductor blade 41 of conductor wire 4 accommodated in the fixing seat 3. In the fourth preferred embodiment of the present invention as illustrated in FIG. 7, within, if the conductor blade 41 of the conductor wire 4 and said protection walls 31A, 31B and 31C of the fixing seat 3 are not in tightly configured, a mobile fixing level 7 can be provided on the bottom side of the lower die 1 to pass through the hole 421 at the plug blade 42 of the conductor wire 4 to hold said plug blade 42 in place without displacement in the course of injection molding. In the fifth preferred embodiment of the present invention as illustrated in FIG. 8, two clamping members 8 can be provided at the bottom side of the lower die 1 so that said members 8 will slide to open when dies are opened up, and clamp to hold the plug blade 42 of the conductor wire 4 in position when dies are closing on.

I claim:

1. A flat plug injection molding device comprised of a lower die, an upper die and a fixing seat in conjunction with conductor wire in practice, wherein a cavity in proper thickness is provided and recessed at the center of the lower die, several holding ribs with arc top are provided on one side and a channel formed and recessed on the other side, with two penetrating holes provided at where appropriately in the center of said cavity, the upper die is provided in counter locked type, and a cavity is provided at the recess in the center of said upper die and a channel on one side corresponding to that at the lower die; the fixing seat are erected on it several protection walls at the right angle in proper height designed in conjunction with the route of the conductor wire and the shape of a conductor blade of the conductor wire, and two penetrating holes are provided at where appropriately; both ends of the conductor wire are each connected with a conductor blade which extends downward to form a plug blade with a hole; the plug blade of the conductor wire passes through the penetrating hole at the fixing seat so that the conductor blade of the conductor wire is restricted by its peripheral protection walls and held tightly against the corresponding plane, the fixing seat of the conductor wire is placed in the cavity of the lower die to be counter locked by its corresponding upper die for the filling of plastics in the injection molding of the flat plug.

2. A flat plug injection molding device as claimed in claim 1, wherein a positioning plate is provided on the fixed seat housing the conductor wire, both bottom sides of said positioning plate are each connected and fixed to an irregular sheet member which holds against the conductor blade.

3. A flat plug injection molding device as claimed in claim 1, wherein an upper cover is provided on the fixing seat housing the conductor wire so that both of said upper cover and the fixing seat housing the conductor wire are wrapped around by plastics for the injection molded flat plug.

4. A flat plug injection molding device as claimed in claim 1, wherein inverse tenon or nip provided on the side of the protection wall on the fixing seat to hold the conductor blade in position.

5. A flat plug injection molding device as claimed in claim 1, wherein a mobile lever is provided at the bottom side of the lower die to pass through the hole of the plug blade of the conductor wire to hold it in position.

6. A flat plug injection molding device as claimed in claim 1, wherein two clamping members are provided at the bottom side of the lower die to clamp and hold the conductor wire in position.

7. A flat plug injection molding device as claimed in claim 1, wherein several protuberances or recesses are provided at where appropriately on the external wall to the fixing seat to provide an excellent bonding for both of the fixing seat and the solidified plastics.

8. A flat plug injection molding device as claimed in claim 2, wherein said positioning plate is molded with of materials other than the plastics of the injection.

9. A flat plug injection molding device as claimed in claim 2, wherein cold light or other illuminating component is provided on said positioning plate utilizing the power from the plug.

* * * * *